May 31, 1927.  1,631,079
S. K. WELLMAN
SHOCK ABSORBER FOR AUTOMOBILES
Filed Nov. 13, 1924
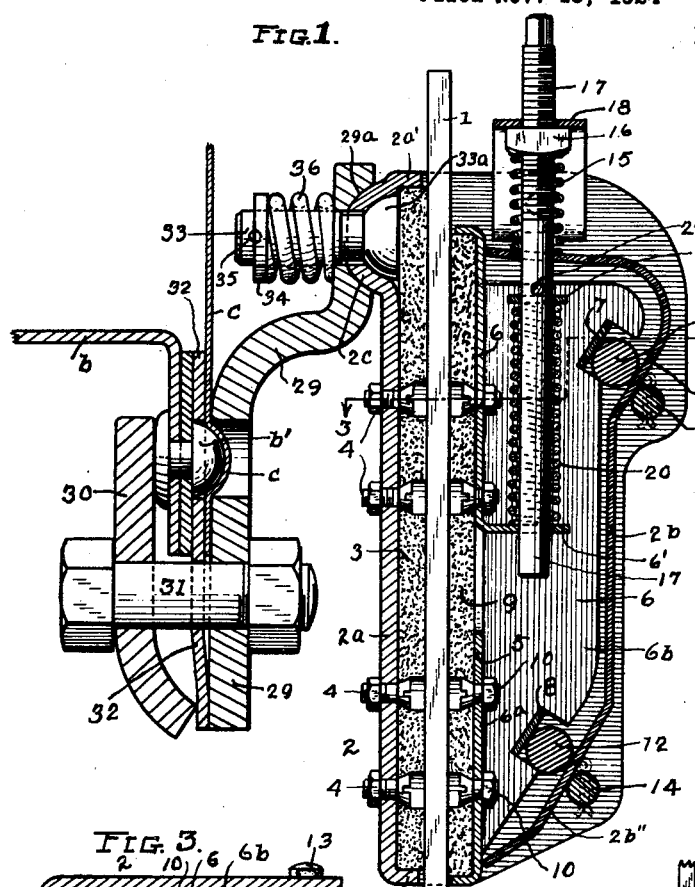
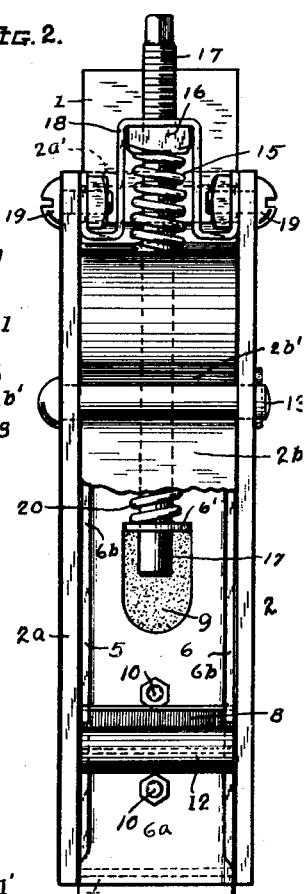
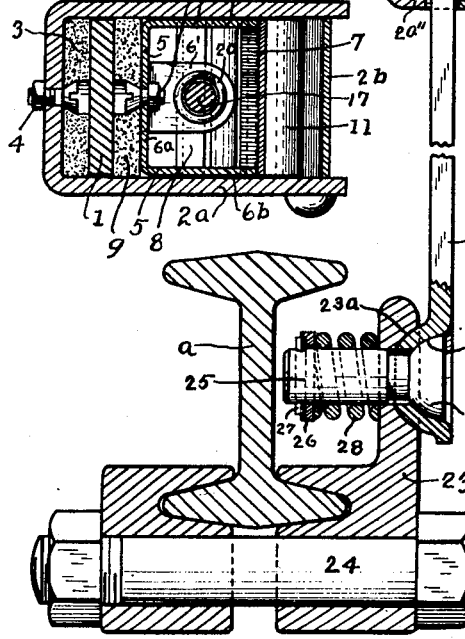
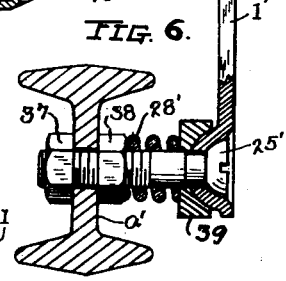
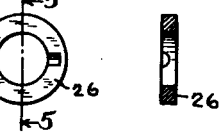
INVENTOR.
Samuel K. Wellman
Ray A. Gehr
Attorney Patented May 31, 1927.

1,631,079

UNITED STATES PATENT OFFICE.

SAMUEL K. WELLMAN, OF CLEVELAND, OHIO.

SHOCK ABSORBER FOR AUTOMOBILES.

Application filed November 13, 1924. Serial No. 749,603.

The invention relates to shock absorbers for motor vehicles and especially to shock absorbers of the type shown in my previously filed application for United States Letters Patent Serial No. 639,728.

One of the objects of the present invention is to provide in a shock absorber of the type in question an improved casing structure which is at once exceedingly strong, simple in construction, easy to manufacture and capable of production at relatively low cost.

A further object of the invention is the provision of a shock absorber of the type in question in which the friction facings can readily be inspected and renewed without separating either of the two main coacting friction parts from the vehicle on which the shock absorber is mounted.

A further object of the invention is the provision of a shock absorber of the type in question in which the friction member movably mounted in the casing is yieldingly pressed against the relatively reciprocating plate in such a manner that said movable member after prolonged use maintains its friction facing in proper working engagement with the friction plate throughout its length.

Another object of the invention is the provision of a shock absorber of the type in question which is adapted to prevent the entrance of dirt or foreign substances between the friction plate and the friction facings which engage it.

A further object of the invention is the provision of improved means for flexibly connecting the coacting friction parts of the shock absorber with the axle and body parts of the vehicle.

Other objects more or less incidental or ancillary to the foregoing will be apparent from the following description which, in conjunction with the accompanying drawing, sets forth the preferred embodiment of my improvements.

In the drawing, Fig. 1 is a vertical, longitudinal sectional view of the shock absorber mounted on a Ford automobile.

Fig. 2 is a front elevation of the shock absorber with a portion of the casing broken away to disclose the interior construction and the lower clamp omitted.

Fig. 3 is a section on the broken line 3—3, Fig. 1.

Fig. 4 is a detail view of one of the coupling parts.

Fig. 5 is a section on the line 5—5, Fig. 4.

Fig. 6 is a vertical section showing a modified form of coupling.

Referring in detail to the construction illustrated, 1 is an elongated friction plate of rolled steel which extends slidably through an elongated casing designated in its entirety by 2. This casing comprises a main channel-shaped part $2^a$, which is preferably stamped from heavy sheet steel, and a second casing member $2^b$ which is preferably formed from a spring steel strip bent or stamped to the form shown in Fig. 1.

To the inner side of the web of the channel member $2^a$ a friction facing 3 is secured by a plurality of screw bolts 4. This friction facing can be of any suitable material and construction in so far as the present invention is concerned but I prefer, and have shown in the drawing, a fibrous material thoroughly impregnated with a substance having a coefficient of friction that is substantially uniform, this material being fully described in my copending application Serial No. 710,700 filed May 2, 1924.

The channel member $2^a$ is preferably formed at its upper and lower ends respectively with lips or flanges $2^{a\prime}$, $2^{a\prime\prime}$ to engage and support the ends of the friction facing 3.

In the casing 2 is mounted an elongated movable friction member 5, the main part of which is in the form of a sheet metal stamping 6 having a flat side $6^a$ and parallel lateral flanges $6^b$ notched near their upper and lower ends respectively to receive and hold transverse bearing plates 7 and 8 which are disposed at angles to the flat side $6^a$ of the member. To this latter side of the member a friction facing 9 similar to the facing 3 is detachably secured by a series of screw bolts 10, 10. The two friction facings 3 and 9 engage the opposite sides of the friction plate 1. Antifriction rollers 11 and 12 are disposed in the notches of the member 5, being interposed between the bearing plates 7 and 8 respectively and inclined wall sections $2^{b\prime}$ and $2^{b\prime\prime}$ with which the casing member $2^b$ is formed. The casing member $2^b$ is secured in position in the channel member $2^a$ in part by transverse bolts or pins 13 and 14 which extend through holes in the flanges of the channel member $2^a$ and engage the outer sides of the inclined wall sections $2^{b\prime}$ and $2^{b\prime\prime}$, respectively, of the casing member $2^b$. The upper end of the casing member $2^b$ is bent over to form a portion of the top wall of the casing and the lower end of the casing member 2ᵇ is similarly bent over to form a portion of the bottom wall of the casing, the upper and lower ends of the casing 2ᵇ being disposed to engage the web of the movable friction member 5 near its ends. The casing member 2ᵇ is further secured in the channel member by means of a coiled spring 15 disposed between the upper end of the casing member 2ᵇ and a nut 16 which engages a threaded spindle 17 extending upward through the upper end of the casing member 2ᵇ and a yoke member 18 which is secured to the flanges of the channel 2ᵃ by means of screw bolts 19, 19. The nut 16 engages the under side of the yoke 18 and the tension of the spring 15 thus tends to press the casing member 2ᵇ downward relative to the channel member 2ᵃ. This pressure, by reason of the cam action of the inclined walls 2ᵇ′ and 2ᵇ″ on the pins 13 and 14 serves to yieldingly press the casing member 2ᵇ at its ends against the respective ends of the movable friction member 5.

The pressure of the spring 15, however, is not relied upon to cause the working pressure of member 5 against the friction plate 1 since the friction between the casing member 2ᵇ and the cross bolts 13 and 14 is great enough so that the necessary delicacy of action would not thus be secured. To secure the desired yielding pressure of the friction member 5 against the plate 1, the friction member 5 is provided with a bracket 6′ which is preferably formed by striking up a tongue from the web 6ᵃ of the channel 6. The bracket 6′ is perforated to serve as a guide for the lower end of the threaded rod 17 and a coil spring 20 is mounted on said rod between the bracket 6′ and an abutment washer 21 secured by a pin 22 in the rod. The tension of the spring 20 yieldingly presses the friction member 5 downward and the reaction of this pressure transmitted through the antifriction rollers 11 and 12 on the inclined walls 2ᵇ′ and 2ᵇ″ of the casing forces the friction member 5 against the friction plate 1, and said plate is of course in turn forced against the friction facing 3. The tension of the spring can readily be adjusted by simply turning the threaded rod 17 to vary the frictional resistance of the movement of the plate 1 in the casing 2.

As will readily be understood, when the vehicle body and axle approach each other the frictional engagement between the plate 1 and friction member 5 tends to move the latter endwise and by reason of the inclination of the casing walls 2ᵇ′ and 2ᵇ″. This movement diminishes the frictional pressure of the member 5 against the plate 1 so that only a small frictional resistance is offered to the compression of the vehicle springs. On the other hand the expanding movement of the springs, or in other words the rebound, is strongly resisted because the frictional engagement between the plate 1 and the friction facing 9 is added to the pressure of the spring 20 acting to force the friction member 5 downward and the resulting cam action of the inclined walls 2ᵇ′ and 2ᵇ″ of the casing transmitted through the antifriction rollers 11 and 12, causes the friction member 5 to press the friction plate 1 between itself and the friction facing 3.

The above described mechanism is operatively secured to the vehicle axle and chassis frame by means of the improved devices which I will now describe. The mechanism illustrated in the drawing is adapted for attachment to the front spring of a Ford automobile. A clamping member 23 is secured to the front axle $a$ of the vehicle by a bolt 24. This clamping member has an aperture formed with a semi-spherical countersink 23ᵃ. The friction plate has its lower end formed in a press with an apertured semi-spherical concavo-convex socket 1ᵃ, the outer side of which fits the countersink 23ᵃ. Then a bolt 25 with a semi-spherical head 25ᵃ to engage the inner side of the socket 1ᵃ extends through the aperture of said socket and the aperture of the clamp 23. The bolt 25 is fitted with a washer or collar 26 which is secured by a pin 27 that fits a transverse hole in the bolt 25. The collar 26 is stamped with a depression in which the pin 27 fits and a coiled spring 28 interposed between the clamp 23 and the collar 26 holds the latter in engagement with the pin 27 and prevents endwise movement of the pin in the bolt. The bolt 25 is reduced in diameter where it passes through the aperture and the plate 1 so that said plate is permitted freedom for considerable movement about the center of the spherical surfaces of the ball and socket joint formed between the head of the bolt 25, the socket 1ᵃ and the countersink 23ᵃ of the clamp. In other words, a universal joint is provided between the friction plate 1 and the clamp 23. This universal connection affords ample freedom of movement for the friction plate 1 for all ordinary swaying, rocking and fore and aft movement of the vehicle body relative to the axle. Provision for further freedom of action is provided in that the spring 28 is formed with several turns and is adapted to permit substantial endwise movement of the bolt 25 in case it is needed to accommodate any extreme movement of the friction plate 1 relative to the front axle. Under all ordinary conditions, however, the spring 28 is adapted to maintain the spherical surfaces of the joint in working contact with each other.

The casing 2 is flexibly secured to the automobile frame in a somewhat similar manner. At the upper end of the casing the web of the channel 2ᵃ is formed with an apertured semi-spherical socket 2ᶜ which cooperates with a clamp secured to the front transverse frame member *b* of the vehicle. This clamp consists of a plate 29 and a plate 30 which are apertured to receive a bolt 31. The plate 29 is apertured to accommodate the head of a structure rivet *b'* of the vehicle frame while the upper end of the plate 30 is adapted to engage the other end of said rivet. The clamp also comprises a relatively thin intermediate plate 32 which is apertured to receive the bolt 31 and also apertured to pass over the head of the rivet *b'*. In the Ford automobile the frame member *b* is covered by the lower part of the front transverse mud guard or apron *c* and when the clamp is applied the intermediate plate 32 is slipped up between the frame member *b* and the apron *c* with the clamping bar 29 engaging the front of the apron *c* and the clamping plate 30 engaging the opposite end of the rivet *b'*. Then when the bolt 31 is tightened the apron *c* is pressed into the aperture 29ᵃ by the rivet head *b'* until the parts are all in firm engagement and the clamp is thus very firmly secured.

The upper end of the clamp plate 29 is formed with an aperture having a semi-spherical countersink 29ᵃ which fits the outer side of the socket 2ᶜ and a bolt 33 extends through the apertures of said socket and clamping plate and has its semi-spherical head 33ᵃ in engagement with the inner side of the socket 2ᶜ, the bolt 33 being secured, as in the case of the lower connection, by a collar 34 and pin 35 with a spring 36 interposed between the collar and the clamping plate 29. Thus the same freedom of movement between the casing 2 and the frame of the vehicle is afforded as in the case of the connection between the lower end of the friction plate 1 and the axle of the vehicle.

It will be understood that a similar shock absorber for the rear spring of a Ford automobile can be provided with suitable clamps of any preferred construction adapted to be attached to the rear axle and rear frame member, respectively, of the vehicle. For example, clamps such as those disclosed in my copending application Serial No. 639,728, above referred to may be employed. Furthermore, in so far as many features of my present invention are concerned, any form of clamp adapted to be secured to the axle and frame members of the various kinds of automobiles can be employed provided they are adapted to be formed with semi-spherical countersinks to receive the socketed friction plate and casing members in the manner above described.

In this connection it is to be observed, too, that the semi-spherical countersink which fits the socket of the friction plate or casing member need not be formed as an anchored member, this fact being brought out by the modified construction shown in Fig. 6.

In Fig. 6 the friction plate 1' is the same as the plate 1 in the first described construction, but the part 25' is in the form of a screw bolt securely anchored in a threaded aperture in the axle A', by means of nuts 37, 38, and a heavy cupped-washer 39 is substituted for the clamp member 23 of the first described construction. The rounded head of the screw bolt 25' and the cup surface of the washer 39 fit the concave and convex sides, respectively, of the socket in the end of the friction plate 1' and these surfaces are yieldingly held in engagement with each other by the coil spring 28' interposed between the nut 38 and the heavy washer 39.

This last form of construction serves to illustrate the fact that either of the ball and socket members which engage the end of the friction plate can be anchored. Obviously the same thing is true of the ball and socket connection between the friction casing 2 and the chassis frame of the vehicle.

In the use of my improved shock absorbers the amount of frictional resistance afforded by them can be varied readily by simply adjusting the threaded rod 17. After prolonged use it may be desirable to renew the friction facings 3 and 9 and with my improved construction this can readily be accomplished without separating either the friction plate 1 or the casing 2 from the vehicle. It is only necessary to remove the pins 13 and 14 whereupon the casing member 2ᵇ and the movable friction member 5 together with the intermediate parts can be removed from the channel member 2ᵃ of the casing. Then the friction plate 1 can be swung out of the channel member sufficiently to expose the friction facing 3 and permit it to be removed and a new one substituted. While the friction member 5 is out of the casing its friction facing 9 can, of course, readily be renewed. It will be observed that this renewal of the friction facings in the manner specified is largely facilitated by the fact that the spring 28 of the ball and socket joint between the friction plate 1 and the axle clamp permits sufficient endwise movement of the bolt 25 to accommodate the necessary swinging movement of the plate 1 out of the channel member of the casing.

A further advantage of my improved construction is that the entrance of dirt between the surfaces of the friction plate 1 and the friction facings 3 and 9 is very largely prevented. And this results in maintaining the uniform character of the friction facing for long periods of use. Dirt has no opportunity to enter directly between the plate 1 and the friction facing because the latter are maintained at their ends in close contact with the friction plate 1. Both the pressure applied to the friction member 5 through the antifriction rollers 11 and 12 and that applied through the ends of the casing member 2ᵇ, are applied at or near the ends of said friction member 5 so that there is no tendency for the latter or for the facing 9 to acquire a bowed or concaved formation, consequently the ends of the facing 9 are always maintained in firm contact with the friction plate 1 and this plate is of course in turn pressed against the ends of the friction facing 3. Furthermore, there is no opportunity for dirt to enter the casing between the movable friction member 5 and the casing member 2ᵇ and thence find access to the engaging surfaces of the friction facing 9 and the friction plate 1, because in the first place there is very little opportunity for dirt to enter between the member 5 and the casing member 2ᵇ and in the second place, if dirt does enter there it cannot accumulate in a position to find entrance between the facing 9 and the plate 1.

It will now be apparent that the construction illustrated in the drawing is made up of a comparatively small number of strong and rugged parts that lend themselves admirably to manufacture by economic methods; and from the above description it will be apparent that the ball and socket connections afford ample freedom of movement between the friction plate 1 and the axle and the casing 2 and the body of the vehicle to accommodate fully all of the operative, relative movements of the body and axle without subjecting any of the parts of the shock absorber to undue stresses.

What I claim is:

1. In a shock absorber adapted to be interposed between an axle and the spring suspended body of a vehicle, the combination of an elongated friction plate connected at one end to one of said vehicle parts; a casing comprising a channel member forming three of the longitudinal sides of the casing and connected to the other vehicle part and a plate detachably secured to said channel member and forming the fourth longitudinal side of said casing; a friction facing secured on the inner side of the web of the channel member to be engaged by one side of said friction plate; and a spring pressed member in the casing engaging the opposite side of the friction plate and yieldingly pressing it against said friction facing.

2. In a shock absorber adapted to be interposed between an axle and the spring suspended body of a vehicle, the combination of a friction plate flexibly connected at one end to one of said vehicle parts; a casing comprising a channel member forming three of the longitudinal sides of the casing and connected to the other vehicle part and a plate detachably secured to said channel member and forming the fourth longitudinal side and portions of the two ends of the casing; a friction facing secured on the inner side of the web of the channel member to be engaged by one side of said friction plate; and a spring pressed member in the casing engaging the opposite side of the friction plate and yieldingly pressing it against said friction facing.

3. In a shock absorber adapted to be interposed between an axle and the spring suspended body of a vehicle, the combination of an elongated friction plate connected at one end to one of said vehicle parts; an elongated casing through which the said plate extends and which is connected to the other vehicle part; a friction facing fixedly secured in the casing to engage one side of the friction plate; an elongated member movably mounted in the casing and having a friction facing to engage the other side of the friction plate; the casing having wall sections adjacent to the respective ends of the elongated member that are inclined toward the plane of the friction plate; and antifriction rollers mounted between said inclined wall sections and the respective adjacent ends of said elongated member.

4. In a shock absorber adapted to be interposed between an axle and the spring suspended body of a vehicle, the combination of an elongated friction plate connected at one end to one of said vehicle parts; an elongated casing comprising a channel member forming three of the longitudinal sides of the casing and connected to the other vehicle part and a plate detachably secured to said channel member and forming the fourth longitudinal side of said casing; a friction facing fixedly secured on the inner side of the web of the channel member to be engaged by one side of said friction plate; an elongated member movably mounted in the casing and having a friction facing to engage the other side of the friction plate; the detachable casing plate having sections adjacent to the respective ends of said elongated member which are inclined toward the plane of the friction plate; pins extending through the flanges of the channel member to engage the outer side of the detachable casing plate adjacent its inclined portions; and antifriction rollers mounted between said inclined wall sections and the said elongated member.

5. In a shock absorber adapted to be interposed between an axle and the spring suspended body of a vehicle, the combination of an elongated friction plate connected at one end to one of said vehicle parts; an elongated casing through which the friction plate extends and comprising an elongated channel member forming three longitudinal side walls of the casing and an elongated casing member between the flanges of said channel member shaped to form a fourth longitudinal side wall and portions of two ends of the casing; a friction facing fixedly secured to the inner side of the web of the channel member to engage one side of the friction plate; an elongated member movably mounted in the casing and having a friction facing to engage the other side of the friction plate; the ends of the second casing member being disposed to engage said movably mounted member near its ends; and means comprising a spring interposed between the two casing members for pressing the second casing member against the said movably mounted member.

6. In a shock absorber adapted to be interposed between an axle and the spring suspended body of a vehicle, the combination of an elongated friction plate connected at one end to one of said vehicle parts; an elongated casing through which the friction plate extends and comprising an elongated channel member forming three longitudinal side walls of the casing and an elongated casing member between the flanges of said channel member shaped to form a fourth longitudinal side wall and portions of two ends of the casing; a friction facing fixedly secured to the inner side of the web of the channel member to engage one side of the friction plate; an elongated member movably mounted in the casing and having a friction facing to engage the other side of the friction plate; the ends of the second casing member being disposed to engage said movably mounted member near its ends; and means for yieldingly pressing the movable member against the friction plate and the second casing member against the movable member.

7. In a shock absorber adapted to be interposed between an axle and the spring-suspended body of a vehicle, the combination of an elongated friction plate flexibly connected at one end to one of said vehicle parts; a casing comprising a member forming three of the longitudinal side walls thereof and a separate member forming the fourth of said longitudinal side walls and detachably secured to the other casing member, one of said casing members being connected to the other of said vehicle parts; an elongated friction facing detachably secured on the inner side of the casing member secured to the vehicle part so as to be engaged by one side of said friction plate; and a spring-pressed member in the casing engaging the opposite side of the friction plate and yieldingly pressing it against said friction facing; the said flexible connection between the friction plate and one of the vehicle parts being adapted when the casing members are separated to permit the friction plate to swing away from the said friction facing and expose it for inspection and renewal.

8. In a shock absorber adapted to be interposed between an axle and the spring suspended body of a vehicle, the combination of an elongated friction plate flexibly connected at one end to one of said vehicle parts; a casing comprising a channel member forming three of the longitudinal side walls of the casing and connected to the other vehicle part and a plate detachably secured to said channel member and forming the fourth longitudinal side wall of said casing; a friction facing detachably secured on the inner side of the web of the channel member to be engaged by one side of said friction plate; and a spring pressed member in the casing engaging the opposite side of the friction plate and yieldingly pressing it against said friction facing; the flexible connection between the friction plate and one of the vehicle parts being adapted to permit the friction plate to swing laterally out of the channel member of the casing when the other casing member is removed to expose the said friction facing for inspection and renewal.

9. In a shock absorber adapted to be interposed between an axle and the spring suspended body of a vehicle, the combination of a pair of relatively movable coacting resistance parts and means for connecting said resistance parts to the vehicle axle and body, respectively, each of said connecting means comprising a perforated concavo-convex socket formed in the resistance part; a perforated member formed with a countersink to fit the convex side of said socket; a bolt extending through the last named member and loosely through the perforation of the socket and having a spherical head fitting the concave side of said socket; an abutment on the bolt spaced from the member with the concave countersink; and a coiled spring having a plurality of turns interposed between the last named member and said abutment; one of the parts other than the resistance member being adapted to be secured to one of the vehicle parts.

10. In a shock absorber adapted to be interposed between an axle and the spring suspended body of a vehicle, the combination of a pair of relatively movable coacting resistance parts and means for connecting said resistance parts to the vehicle axle and body, respectively, each of said connecting means comprising a perforated concavo-convex socket formed in the resistance part; a perforated member formed wih a countersink to fit the convex side of said socket; a bolt extending through the last named member and loosely through the perforation of the socket and having a spherical head fitting the concave side of said socket; an abutment washer on the bolt formed in its central part with a lateral depression and a transverse pin extending through the bolt and resting in said depression of the abutment washer; and a coiled spring interposed between the abutment washer and the member with the concave countersink.

11. In a shock absorber adapted to be interposed between the axle and the spring suspending body of a Ford motor car, the combination of a pair of relatively movable coacting resistance parts; means for connecting one of said resistance parts to the automobile axle; and means for connecting the other of said parts to the front transverse channel bar of the chassis frame of the automobile comprising a clamping plate with a perforation adapted to register with the head of a rivet of the said channel part, a second clamping plate adapted to engage the other end of the same rivet, a clamping bolt extending through both clamping plates and adapted to draw them together, and an intermediate plate between the two clamping plates perforated to receive the said bolt and also perforated to pass over the head of the rivet which registers with the perforation in the first named clamping plate.

12. In a shock absorber of the character described, a stationary friction member, a movable friction member, a wedging roller associated with said movable friction member, a member associated with said stationary friction member provided with an inclined surface and so positioned as to be engaged by said roller and wedging said friction members together when said movable member is moved in one direction, and releasing the same when moved in the other direction, a bolt provided with an abutment shoulder and adjustably mounted with respect to said stationary member, an ear through which said bolt extends, and a spring secured between said ear and the abutment shoulder of said bolt for normally maintaining said movable member and wedging roller in operative position under spring tension.

13. In a shock absorber of the character described, a stationary member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, a wedging roller mounted in said recess, a cover plate positioned between said side walls and having an inclined surface adapted to be engaged by said roller for forcing said movable member into frictional engagement when moved in one direction, means mounted in said side walls for maintaining said cover member in operative and inclosing position, a bolt provided with an abutment shoulder and adjustably mounted with respect to said stationary member, an ear projecting from said movable member through which said bolt slidably extends, and a spring secured between said ear and the abutment shoulder of said bolt for normally maintaining said movable member in operative position under spring tension.

14. In a shock absorber of the character described, a stationary friction member, a movable friction member, a wedging roller associated with said movable friction member adjacent one end thereof, a second wedging roller associated therewith adjacent the other end thereof and a member associated with said stationary friction member provided with a pair of inclined surfaces spaced apart and extending in substantially parallel planes to each other and positioned to be engaged respectively by said rollers for wedging said friction members together when said movable member is moved in one direction and releasing the same when moved in the other direction, a bolt provided with an abutment shoulder and adjustably mounted with respect to said stationary member, an ear projecting from said movable member through which said bolt slidably extends, and a spring secured between said ear and the abutment shoulder of said bolt for normally maintaining said movable member and wedging rollers in operative position under spring tension.

15. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction and means mounted in said side walls for maintaining said cover member in operative and inclosing position.

16. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction, means mounted in said side walls for maintaining said cover member in operative and inclosing position, and means for yieldingly maintaining said movable friction member and wedging rollers in operative position.

17. In a shock absorber of the character described, a stationary friction member having flanges formed thereon and extending at right angles thereto for providing a pair of side walls, a movable friction member having a pair of flanges formed thereon and extending at right angles thereto so as to lie adjacent said casing side walls, said flanges being provided with a recess formed adjacent each end thereof, wedging rollers mounted in each of said recesses, a cover plate positioned between said side walls and having a pair of spaced inclined surfaces adapted to be engaged by said rollers for forcing said movable member into frictional engagement when moved in one direction, means mounted in said side walls for maintaining said cover member in operative and inclosing position, a bolt provided with an abutment shoulder and adjustably mounted with respect to said stationary member, an ear projecting from said movable member through which said bolt slidably extends, and a spring secured between said ear and the abutment shoulder of said bolt for normally maintaining said movable member and wedging rollers in operative position under spring tension.

18. In a shock absorber of the character described, a stationary friction member, an inclosing casing mounted thereon, a movable friction member mounted in said casing, a friction plate frictionally engageable between said members, means for wedging said movable member into frictional engagement with said plate when moved in one direction and releasing the same when moved in the other direction, a projection on said movable member, a bolt provided with an abutment shoulder and slidably extending through said projection and adapted to screw in and out of one end of said casing, and a spiral spring surrounding said bolt and positioned between the abutment shoulder thereof and the said projection, the tension of said spring being varied by the adjustment of said bolt in the end of said casing to yieldingly maintain said movable friction member normally in frictional engagement with said friction plate and resist by the tension thereof the movement of said member out of frictional engagement with said plate.

19. In a shock absorber of the character described, a stationary friction member, an inclosing casing mounted thereon, a movable friction member mounted in said casing, a friction plate frictionally engageable between said members, means for wedging said movable member into frictional engagement with said plate when moved in one direction and releasing the same when moved in the other direction, and adjustable yielding means associated with said movable member for normally maintaining it in frictional engagement with said friction plate and yieldingly resisting its movement to non-engaging position.

In testimony whereof, I hereunto affix my signature.

SAMUEL K. WELLMAN.